Sept. 8, 1970 R. F. DE FALCO 3,528,055
SAFETY ALERTING SYSTEM FOR DUMP-BODY VEHICLES
Filed Nov. 18, 1968 2 Sheets-Sheet 1
FIG. I
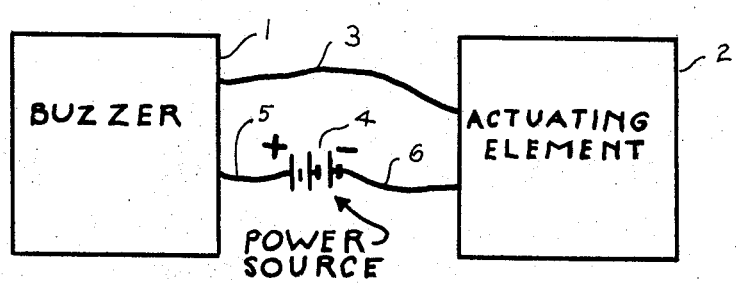
FIG. II
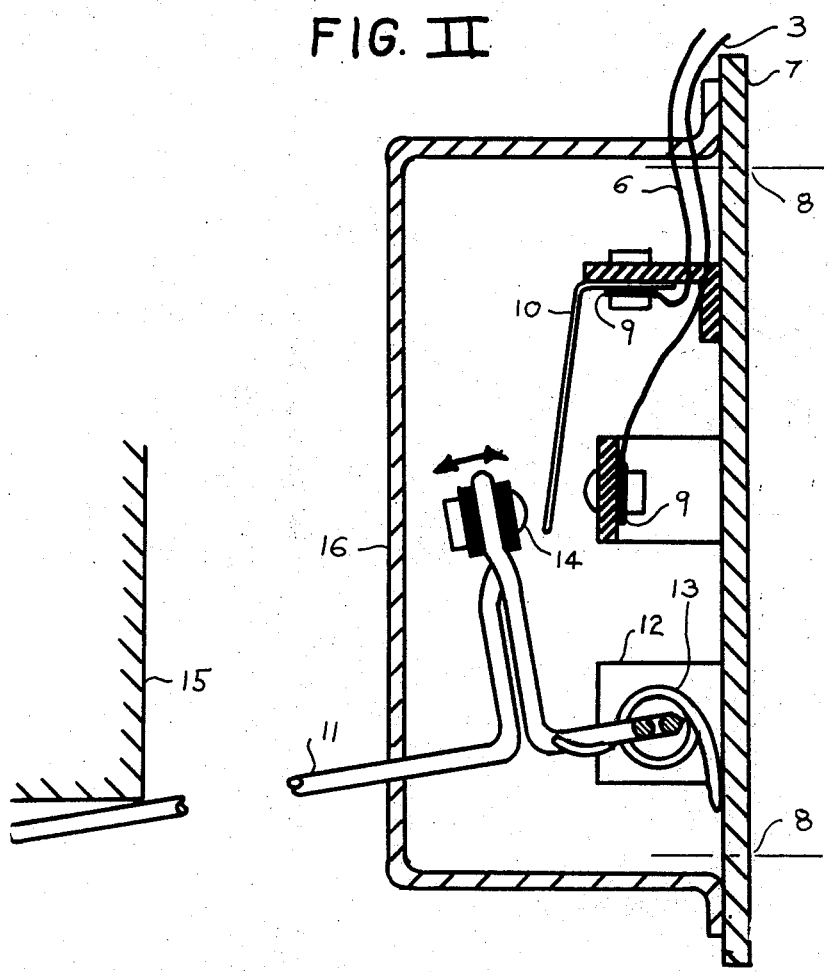
INVENTOR.
Richard F. DeFalco

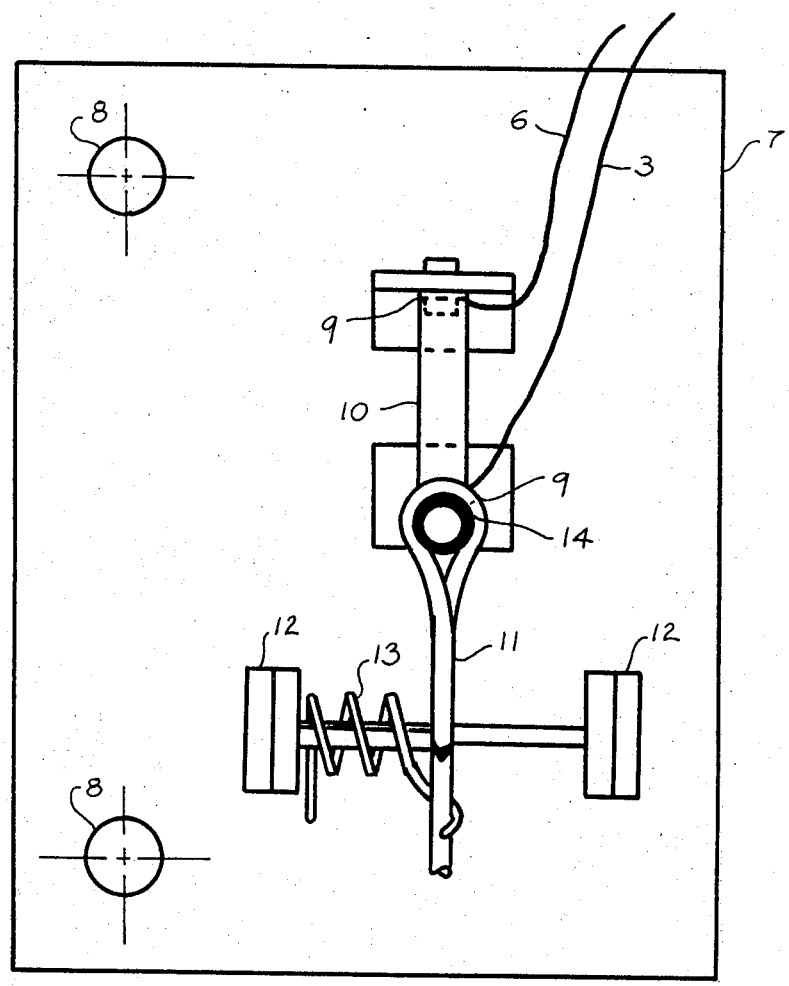

United States Patent Office 3,528,055
Patented Sept. 8, 1970

3,528,055
SAFETY ALERTING SYSTEM FOR DUMP-BODY VEHICLES
Richard Francis De Falco, 52 Lakewood St., Worcester, Mass. 01603
Filed Nov. 18, 1968, Ser. No. 776,610
Int. Cl. B60p *1/04*
U.S. Cl. 340—52                    1 Claim

ABSTRACT OF THE DISCLOSURE

The present invention relates generally to a safety alerting system for trucks and/or other vehicles having a dump-body and more particularly, to an alerting system for providing a warning signal to the operator of the vehicle when the body of the vehicle is raised from its seated position.

---

Many serious accidents have occurred due to a dump truck being driven along while the driver was unaware that the body of the truck was up. Generally, this happens because the operator is in such a great rush, he does not notice that the hoist mechanisms have become engaged and consequently the body has gone up. The accident occurs when the upraised body crashes into electric wires, trees, bridges, or other obstacles. The resulting damage is often quite severe and sometimes fatalities occur. Therefore, it is the main object of the present invention to provide an alerting system which will indicate to the vehicle operator when the body of the truck has raised from its seated position, thereby warning the operator that the truck is in a possibly hazardous position.

Another very important object of the present invention, is to provide a safety alerting system for dump-body vehicles which is a complete and separate unit, effective for signalling, easily attached to new or existing dump-body vehicles, and is relatively inexpensive to manufacture.

A further object of the present invention, is to provide a safety alerting system for dump-body vehicles which is connected into the electric circuitry of the vehicle so that the signalling circuit will be energized only when the ignition switch of the vehicle is in the "on" position.

It is still a further object of the present invention, to provide, as part of the alerting system, an actuating element which will be operated by the motion of the dump-body and will activate the signalling circuit when the body is raised from its seated position and will deactivate the signalling circuit when the body returns to its seated position.

These, together with further objects, features and advantages, which will become apparent, are more fully hereinafter described, reference being had to the accompanying drawings forming a part hereof, in which like numbers refer to like parts throughhout.

Briefly describing the invention, it is contemplated that an audible buzzer will be conveniently located within the cab of the vehicle such that it will be unmistakably audible to the operator when it sounds. This audible buzzer will be electrically connected to and controlled by an actuating element, which, in turn, is operated by the vertical motion of the body of the vehicle. The actuating element is, simply, an electric switch which is opened and closed by the action of a pivotable, spring-mounted lever arm which comes into contact with the underside of the body of the vehicle. The actuating element is attached to the rear, lower, outside portion of the cab of the vehicle, such that, when the body of the vehicle is down, it depresses the pivotable lever arm, thereby opening the electric switch; as the body of the vehicle goes up, the pivotable lever arm moves upward by virtue of the recoil action of the spring on which it is mounted, thereby closing the electric switch. The buzzer and the actuating element will be connected into the electric circuitry of the vehicle so that the signalling circuit will be energized only when the ignition switch of the vehicle is in the "on" position.

Referring now to the patent drawings:
FIG. I shows the several parts of the Alerting System and the relationship between these parts.
FIGS. II and III are sectional views of the Actuating Element showing its method of operation.

Referring now particularly to FIG. I of the patent drawings, an audible buzzer 1, which will be placed within the cab of the vehicle so as to unmistakably audible to the operator when sounded, is connected from its first terminal to the first terminal of an actuating element 2, which will be rigidly fastened to the outside, rear, lower part of the cab of the vehicle, by a conductive lead 3. The second terminal of the audible buzzer 1 is connected to the first terminal of a power source 4 by a conductive lead 5. The second terminals of the power source 4 and the actuating element 2 are connected by a conductive lead 6. Thereby, a series electrical circuit is formed between the audible buzzer 1, the power source 4, and the actuating element 2. The power source 4 will be obtained from the electrical circuitry of the vehicle. The flow of electricity through the thus formed electrical circuit is controlled by the actuating element 2. Conductive leads 5 and 6 are connected into the electric circuitry of the vehicle so that the signalling circuit will be energized only when the ignition switch of the vehicle is in the "on" position.

Referring now to FIG. II of the patent drawings, the actuating element 2 is shown in a side, sectional view. A base plate 7 is constructed with adequate bolt holes 8 to be rigidly attached to the rear, lower, outside portion of the cab of the vehicle. Attached to the base plate 7 are two electric terminals 9. A resilient electrical conductor 10 is rigidly attached to the upper terminal 9 and extends down to and in front of the lower terminal 9. The normal position of the resilient electrical conductor 10 is as shown, that it is not in contact with the lower terminal 9, thereby creating an "open" signalling circuit. Also attached to the base plate 7 is a pivotable lever arm 11, which is held in place by two grips 12, attached to the base plate 7, having each a recess therein to receive and hold in place the transverse end of the pivotable lever arm 11. Coiled around the transverse end of the pivotable lever arm 11 is a cylindrical spring 13, attached so that the recoil action of the spring 13 will rotate the pivotable lever arm 11 upward and bring the contact head 14 of the pivotable lever arm into contact with the resilient electrical conductor 10 and force it into contact with the lower terminal 9, thereby "closing" the signalling circuit. The pivotable lever arm 11 extends a sufficient distance from the base plate 7 to allow it to make contact with the underside of the forward edge of the body of the vehicle 15 when the body is in its "seated" (down) position. The base plate 7 is positioned on the rear, lower, outside portion of the cab of the vehicle so that when the forward edge of the body 15 is less than approximately six (6) inches above its seated position, it will come into contact with the pivotable lever arm 11 and force it downward, thereby allowing the resilient electrical conductor 10 to break contact with the lower terminal 9, thereby creating an "open" signalling circuit. When the forward edge of the body of the vehicle 15 is raised approximately six (6) inches or more from its seated position, the recoil action of the coiled spring 13 will serve to rotate the pivotable lever arm 11 upward, bringing the contact head 14 into contact with the resilient electrical conductor 10 and force it into contact with the lower electric terminal 9, thereby "closing" the signalling circuit.

A cover plate 16, having a slot in the front thereof to allow the protrusion and vertical motion of the pivotable lever arm 11, is attached to the base plate 7 to protect the elements mounted on the base plate.

The foregoing is considered as illustrative only of the principles and general mechanical arrangement of the invention. Further, since numerous modifications and changes will readily occur to those skilled in the art, it is not desired to limit the invention to the exact construction and operation shown and described, and accordingly all suitable modifications or equivalents may be resorted to, falling within the true spirit and scope as defined in the appended claim.

What is claimed as new is as follows:

1. A safety alerting system for dump-body vehicles for alerting the operation of said vehicle when the forward edge of the body of said vehicle is raised approximately six (6) inches or more from its seated position comprising a signalling means to alert the operator of said vehicle; switch means for opening and closing a signalling circuit; means operating said switch means in response to proper and improper orientation of the forward edge of said body of said vehicle for opening the signal circuit when the forward edge of said body of said vehicle is raised less than aproximately six (6) inches above its seated position and allowing the signal circuit to remain closed when the forward edge of said body of said vehicle is raised approximately six (6) inches or more above its seated position; said means for operating the switch means comprising a base plate, rigidly secured to the outside, rear, lower portion of the cab of said vehicle, said switch means being mounted on said base plate; a pivotabl lever arm pivotably mounted on said base plate for operating the switch means, and extending therefrom a sufficient distance to make contact with the underside of the forward edge of said body of said vehicle; a spring means encircling the transverse end of said pivotable lever arm for biasing said pivotable lever arm into operative engagement with said switch means so that when the forward edge of said body of said vehicle is raised approximately six (6) inches or more from its seated position, the spring means will serve to rotate the pivotable lever arm for operating the switch means to close the signal circuit; a cover box, having a slot in the front thereof for allowing the pivotable lever arm to protrude therefrom and to move in a limited vertical motion, for protecting the elements mounted on said base plate, and including means for attachment to said base plate; and means for connecting said switch means to said signalling means to the electrical system of said vehicle so that the signal circuit will be energized only when the ignition switch of said vehicle is in the "on" position.

References Cited

UNITED STATES PATENTS

| | | | |
|---|---|---|---|
| 2,200,570 | 5/1940 | Zint | 200—61.41 X |
| 2,576,017 | 11/1951 | Jeffrey | 180—103 X |
| 2,887,672 | 5/1959 | Morano | 340—52 |
| 2,927,310 | 3/1960 | Knapp | 200—61.44 |
| 3,269,783 | 8/1966 | Kriz | 200—61.44 X |

RICHARD J. JOHNSON, Primary Examiner

U.S. Cl. X.R.

200—61.58; 298—1